United States Patent [19]

Weber

[11] 4,263,552

[45] Apr. 21, 1981

[54] TRANSLATIVE INTELLIGENCER APPARATUS PROVIDING POLYINDICATIVE RESPONSE

[76] Inventor: Harold J. Weber, 20 Whitney Dr., Sherborn, Mass. 01770

[21] Appl. No.: 967,585

[22] Filed: Dec. 8, 1978

[51] Int. Cl.³ .............................................. G01V 3/11
[52] U.S. Cl. .................................................. 324/326
[58] Field of Search .................. 324/52, 67, 326, 337; 325/301, 302; 455/132–134, 137, 140, 141

[56] References Cited

U.S. PATENT DOCUMENTS 3,392,384   7/1968   Wesch .............................. 324/337 X

FOREIGN PATENT DOCUMENTS

1056768   1/1967   United Kingdom ...................... 324/67

Primary Examiner—Gerard R. Strecker

[57] ABSTRACT

My invention relates to improved means for a concealed structure detector apparatus, and more particularly, to a portable device producing a polyindicative, usually biphonic, sensory response capable of providing the operator with an indication of the relative direction of lay for a covert structurement. The detector responds to pulse pattern modulated electromagnetic field signals established in the concealment object by a separate acting efficacious exciter means. The detector includes at least two inducers which are axilly offset and thereby effective to independently respond to variation in the electromagnetic field lines emanating from the structure in proportionate accordance to the relative positions of the individual inducers with respect to the structure. The demodulated pulse pattern signals effectively produced by each inducer response are each conditioned in a substantially independent manner, therefrom resulting in an indicative form capable of providing an intelligent being with a sense of directionality, exampledly "right" or "left" orientation relative to a concealed structure.

12 Claims, 11 Drawing Figures

TRANSLATIVE INTELLIGENCER APPARATUS PROVIDING POLYINDICATIVE RESPONSE

BACKGROUND OF INVENTION

The instant invention finds particular application in the field of locating and surveying concealed structures.

More broadly, the invention finds application for positional, or other value indicative, measurement of the magnitude of at least two input signals and producing therefrom a directly derived signification as to the magnitude of each respective input signal as well as the measure of deviation between the individual input signal values.

The effective result is an output pattern of directly derived pulse train periodicities, or else binary code values, representative of each of several input signal levels.

Prior teachings have shown the artisian several ways to achieve, by indirect deriviation, audio frequency output signals from concealed object detectors which are in part proportional to the amplitude of an inputted signal as might be induced by an electromagnetic field emanating from a concealed structure or the like. A particularly accomplished such teaching appears in U.S. Pat. No. 4,044,299, Weber: "Concealed Structure Locating and Surveying Translator Apparatus".

More advanced teachings by Weber in U.S. Pat. No. 4,147,973 "Frequency Dependent Amplitude Modulated Translator Apparatus" is given wherein an audio frequency rate periodic monophonic output signal is produced as a direct deriviative of the special modulating waveform produced by an efficacious exciter such as described by Weber in U.S. Pat. No. 4,137,500 "Frequency Dependent Amplitude Modulated Exciter Apparatus". The prior work by Weber and others is not anticipative of the effectual use of more than one inducer, or input means, nor more than one, say monophonic, output signal means.

The essence of the present invention is therefore to:
- provide at least two input signal input terminal means;
- provide at least two output signification responser means;
- provide a stereophonic-like, or else multiphonic, output indication to a human operator thereof primarily for purpose of RIGHT or LEFT positional relationship;
- provide a binary code signal therefrom the encoded value of which gives weight to each of the several input signal levels;
- and, most importantly all the aforesaid improvements are taught making the most effective use of the input signal values as to produce an effectively stable, meaningful signal output therefrom which may be used and adjusted by operators of minimal skill;
- and furthermore, the taught apparatus employs a minimum of low cost elements to attain the desired result, using a minimum of power thereby extending the practical life of batteries or the like when portable operation of the combination is necessary.

SUMMARY

A translator, or receptor means, is described which serves to accept various value electromagnetic field signal levels into at least two seperately operative inputs. Included are successive amplifying and signal processing stages which serve to act upon each of the several input signal values, usually in a time-sequential manner, so as to provide several directly derived output signals therefrom which are proportional in value to each of the respective input signal levels.

In one practiced form of my invention, the output results in at least two substantially separate audio frequency signals coupled to a human operator's ears in the manner of a stereophonic signal so as to produce a sense of positional relationship therefrom between the operator and the source of input signals. The usual result is an audio signal the pitch, or periodicity, of which indicates magnitude, e.g., general proximity or nearness to the subject signal source whereas the difference in pitch between the several outputs is at least suggestively indicative to the operator as to his proximal bearing relative to the subject signal source.

In another practiced form my invention yields a binary code bit pattern (byte pattern) signal at an output which is directly derived and proportional to each of the several input signal levels. The result is a binary code format which can serve to provide DATA for the control of a computer means, or else a succession of binary control devices which can provide digitally controlled indication, or other function, to an operator or other intelligent means as to the proximal relationship between the translator and the covert signal source.

The indicative signals provided by this teaching are directly derived from the modulating component provided by a separate efficacious exciter means. This is in important contrast to and shows significant improvement over prior known methods employing voltage controlled oscillators or equivalent means which serve to produce, by indirect means, a signal output which is merely indirectly related to the input signal value.

DESCRIPTION OF PREFERRED EMBODIMENT

Figure 1:
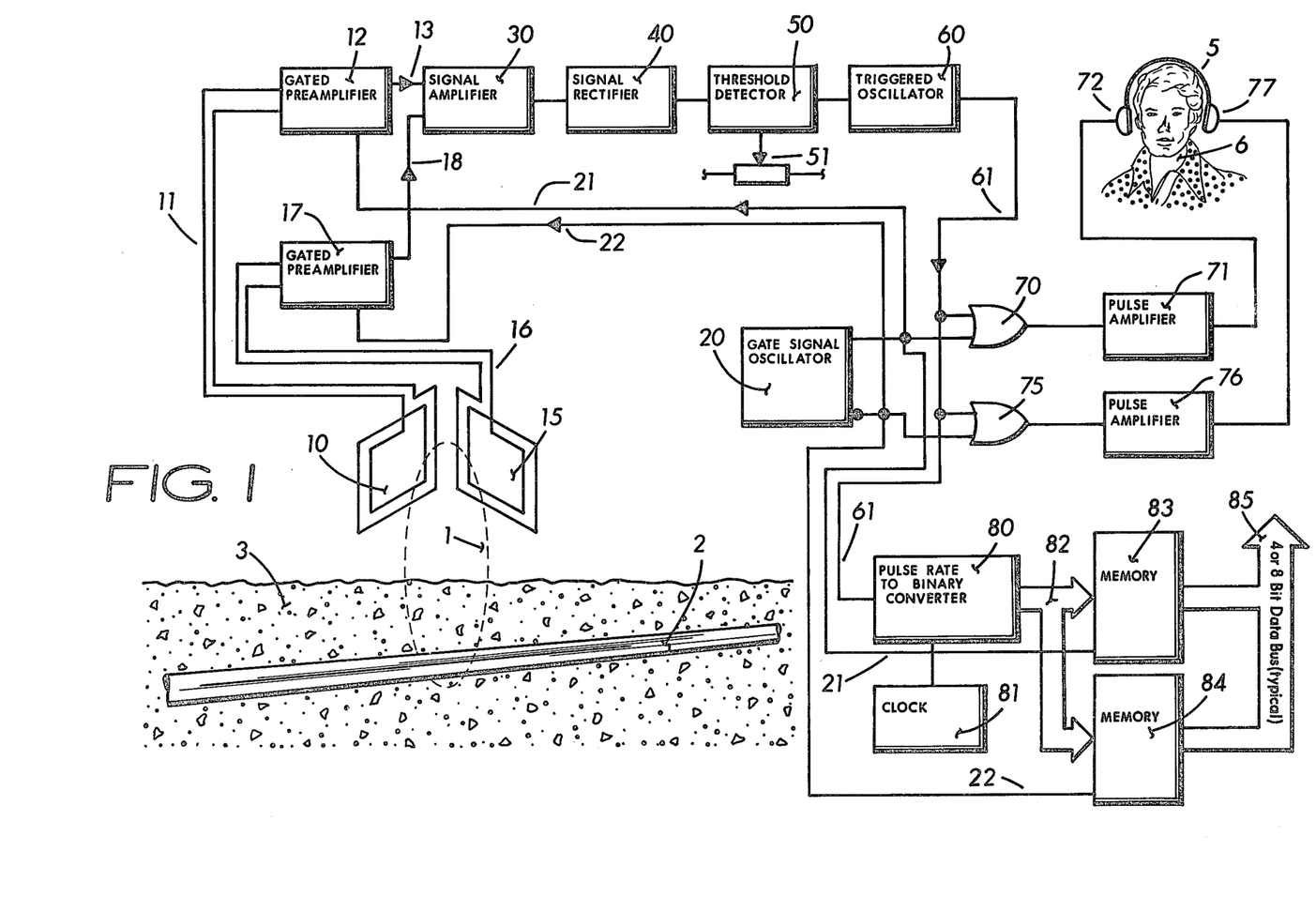
FIG. 1 composite functional diagram showing receptor means, operator interpretative means, and binary signal deriviation means for cooperation with an external computer.

FIG. 1 shows first signal electromagnetic field lines 1 emanating from a buried pipe 2, or like structure, concealed in medium 3. The field lines 1 have been purposefully induced in the structure 2 by separate efficacious exciter means, viz that described in U.S. Pat. No. 4,137,500 for example. The said field lines are intercepted by plural inducer, or loop antennae, means 10, 15 which serve as first and second input terminal means for my instant apparatus, with varying coupling effectiveness dependent upon the proximal, usually transverse, relationship between the inducers and the structure. The coupling effect is that of a variable impedance between the exciter means source and the input terminal means which is proportional to the efficiency of coupling therebetween. The resulting second signal "A" 11 from, say right hand, inducer 10 and second signal "B" 16 from, say left hand, inducer 15 are each inputed to respective gated preamplifiers 12, 17. A gate control signal oscillator 20 produces two push-pull, or complementary, outputs 21, 22 which serve to effectively turn preamplifiers 12, 17 on and off in alternate synchronism. The resulting alternant, e.g., multiplexed, combination of second signals "A" and "B" serves to produce a component third signal "A", else 13, and component third signal "B", else 18, which combine to produce a composite third signal at the input of signal amplifier 30. The increased value signal from amplifier 30 is demodulated by envelope detector, else signal rectifier, 40 producing therefrom a pulse-like fourth signal waveform which is derived from the fundamental components which serve to make up the presaid first frequency envelope. A threshold detector 50 establishes the level of the pulse-like waveform which will be therefrom outputed, by way of threshold level adjustment 51. The resultant selected pulse-like fifth signal waveform from the threshold detector serves to drive a signal processor, say triggered oscillator, means 60 the main function for which is to unify the pulse-like fifth signal input into sixth signal pulses of more uniform constancy 61.

The resulting sixth signal 61 in one embodiment serves to drive the first input of each of two gate means 70, 75, whilst the said gate control signal source 20 serves to alternately drive, else control, the second input of each gate 70, 75. The result is independent gated intelligencer signal outputs from gates 70, 75 which are substantially proportional signals, albeit multiplexed, of the relative value of the intercepted second signal "A" and second signal "B" produced by the respective inducers 10, 15. Gate 70, 75 outputs serve to drive pulse, or audio, amplifiers 71, 76 so as to produce an audible indication 72, 77 from stereophonic-like headset 5 for an operator 6. The result is a "left" or "right" indication to the operator 6 by way of different tone, or audio pitch, signals in the individual earphones 72, 77 proportional to the proximal relationship between the loop antennae 10, 15 and the covert structure 2.

In another embodiment the sixth signal 61 serves to input to a pulse rate to binary converter (PRBC) 80. The purpose of the PRBC, in conjunction with a system clock 81, is to produce a multi-bit binary signal 82 therefrom that is proportional to the rate of the inputed sixth signal 61. The binary signals 82 from the PRBC 80 serve to drive two separate memory facilities 83, 84. The memories function to store second signal "A" or second signal "B" related binary data by way of alternate gate control signals 21, 22 producing "write", else "store", control signals for the individual memories. The memory outputs are utilized, in one form, to feed a four, or else eight, bit data bus of usual form which can therefrom serve to interface with a computer system, digital display system, or other control apparatus. While not detailedly shown, a skilled artisian would understand that a d.c. power source for operation of the described functions would be usual practice, as would be auxilliary operator controls and adjustments for effective convenience, say volume and gain controls, tuning adjustments, and so on. Furthermore it is to be understood that the principle of two multiplexed second signal inputs, as well as two de-multiplexed signal outputs can be extended to any plurality of inputs and outputs when advantage is to be served by such additional circuit complexity.

Figure 2:
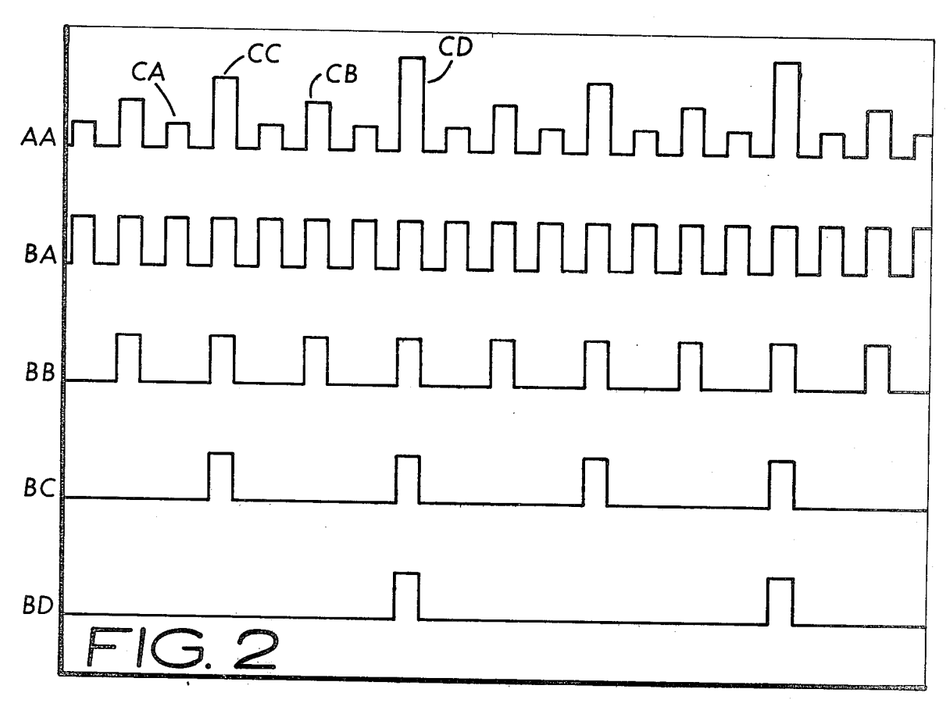
FIG. 2 waveform representations for four-level composite signal format.

The unique waveform comprising the component first signal, i.e., the modulating signal in the event of a high frequency, say radio frequency rate first signal is shown in FIG. 2. Four particular rates are illustratively shown, the highest rate being represented by waveform BA, whereas the slowest rate is the waveform BD representation. Each rate BA through BD is one-half the higher rate, for example, if:

BA=4,000 hertz,
then BB=2,000 hertz,
also BC=1,000 hertz, and
also BD=500 hertz.

In waveform AA it is shown the most frequent pulse signal waveform BA serves to produce the lowest amplitude recurrent resultant signals CA. Accordingly next highest rate signal BB produces a signal CB which is of somewhat greater magnitude than signal CA but coincident with one series of the signal CA components. Continuedly, signal BC produces a signal CC which is of somewhat greater magnitude than signal CB but yet is coincident with one of the signal CA component signals as combined with signal CB components. Followingly, signal BD produces a signal CD which is, in this example, of greatest magnitude but yet coincident with one of the signal CA, signal CB, and signal CC combined component series. The result, again, is the waveform AA of predictably repetitive multilevel value.

Figure 3:
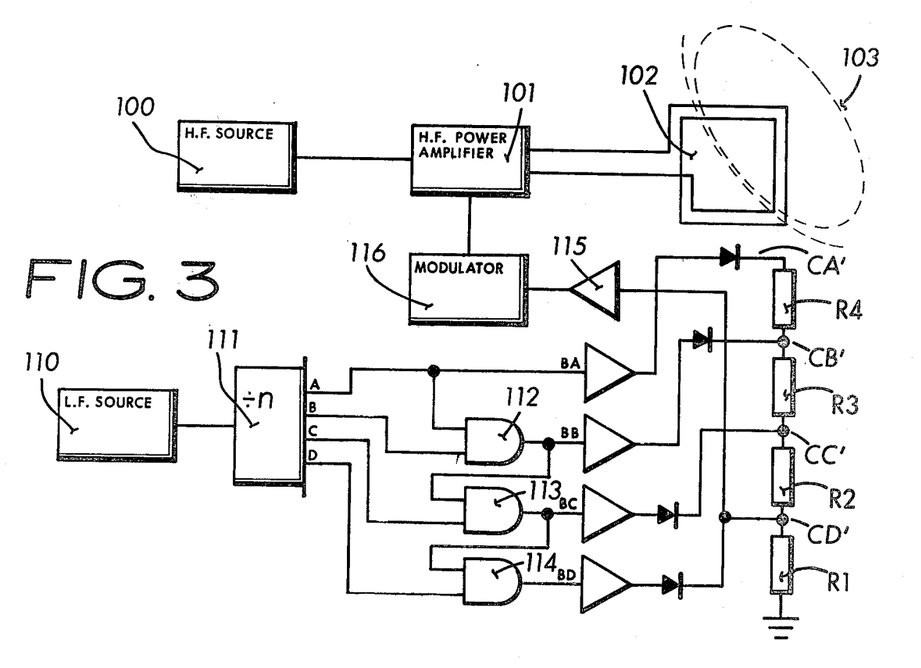
FIG. 3 illustrative exciter means for developing unique level variant first signal.

A demonstrative circuit for developing, exampledly, a four level composite pulse train modulated amplitude variant first signal source is shown in FIG. 3. While shown are four level effecting stages, the method is readily expandable to "n" stages or levels of elaboration to suit a specific task at hand. A source 110 of low frequency, e.g. usually audio frequency, oscillations provides a signal which is double that of the highest rate desired pulse train periodicity. The clock or audio frequency source 110, typified as 8-kilohertz, serves to drive a four bit binary counter 111 which resultingly produces four bit line outputs D, C, B, A and respective typical pulse train periodicities of 500 Hz, 1-KHz, 2-KHz, and 4-KHz. Combinative circuits consisting principally of two-input AND logic gates 112, 113, 114 serve to produce three unique control signals BB, BC and BD in addition to the BA signal directly derived from the counter A output. The AND gate signal outputs are unique in that only once during every sixteen clock cycles can an output occur at the output of gate 114 on line BD, or only once for every eight clock cycles at the output of gate 113 on line BC, or only once for every four clock cycles at the output of gate 112 on line BB, whilst line BA produces an output change for every other clock cycle. The four outputs serve to drive buffers which couple through steering diodes to a resistor ladder network. For purpose of discussion, if:

resistor R1=R,
resistor R2=0.333 R,
resistor R3=0.667 R, and
resistor R4=2.0 R, then the result will be that at the summing point, being the junction of resistors R1 and R2, e.g., the input CD of isolation amplifier 115, the level for the different pulse train period bursts will be, where level equals "E", as:

1.0 E, 0.75 E, 0.50 E, and 0.25 E, or in effect the most frequent pulse train rate BA will be but 25% of the lowest periodicity pulse train BD. In the circuit as shown, the value E is that of the output of the buffer when the buffer is HIGH, else logic 1, which with C-MOS is very near the positive rail value, less any inherent drop through the steering diode, say 0.6 volts or so. For example, the buffer elements used by me have been C-MOS type CD-4050A, whereas the diodes have been 1N914. The isolation amplifier, sayd type CA3140, or uA-741, serves to drive an amplitude modulator 116 which acts upon the high frequency source, said radio frequency oscillator 100 driving a power amplifier 101 so as to effect an electromagnetic field 103 from the inducer 102 which is modulated as bursts of at least several cycles of radio frequency signal the instantaneous mean level of which is determined by the summing combination amplitude produced by the composite combinatorial circuit.

Figure 4:
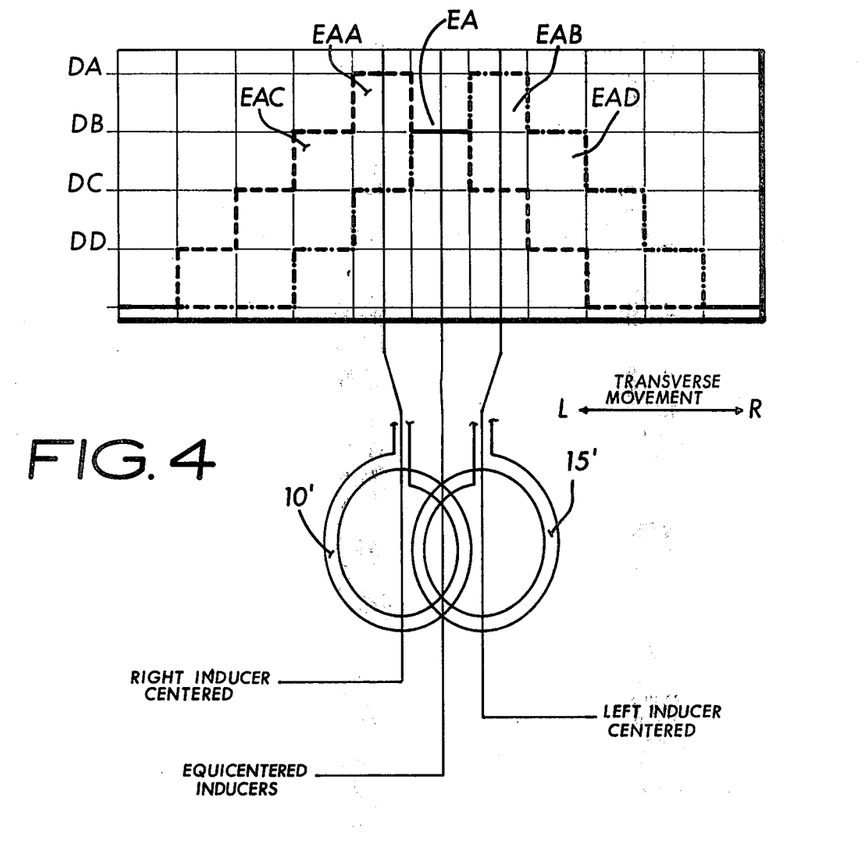
FIG. 4 right and left deviation inducer effectuations are shown relative to resultant sixth signal output values.

Shown in FIG. 4 is the effect of transverse movement of the inducers 10', 15' relative to a field emanative structure. When both the inducers 10', 15' are equicentered, the typical resultant output EA will be a pulse rate sixth signal in each earphone, for example, which is of equal periodicity DB. As the right inducer 10' is centered, thereby placing the left inducer 15' in yet less favorable relationship, the effective right earphone sixth signal EAA will be of highest rate DA whereas the left sixth signal rate will decrease to value DC. Conversely, left inducer centering over the emanating first signal concealment will result in maximum rate output DA from the left earphone EAB whereas the right earphone will produce a lower rate, say DC. What is shown is the effective resultant sixth signal pitch "slides" up and down in a step-like manner from one defined periodicity to the next.

Figure 5:
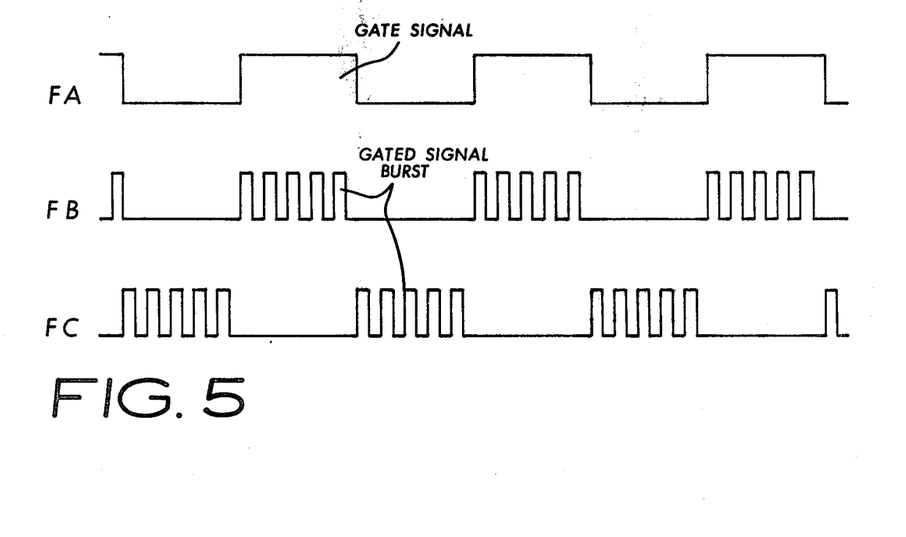
FIG. 5 illustrative waveform shows gate signal controlled bursts of sixth signal in two alternant channels.

The effect of the gate control signal FA on the resultant sixth signal outputs is shown in FIG. 5. The gate control signal, being of low periodicity of several hertz serves to alternately gate the sixth signals, say right and left channel, into separate signal bursts FB, FC which are recurring in a sequential manner and further, wherein each burst contains at least a few cycles of sixth frequency signal.

Figure 6:
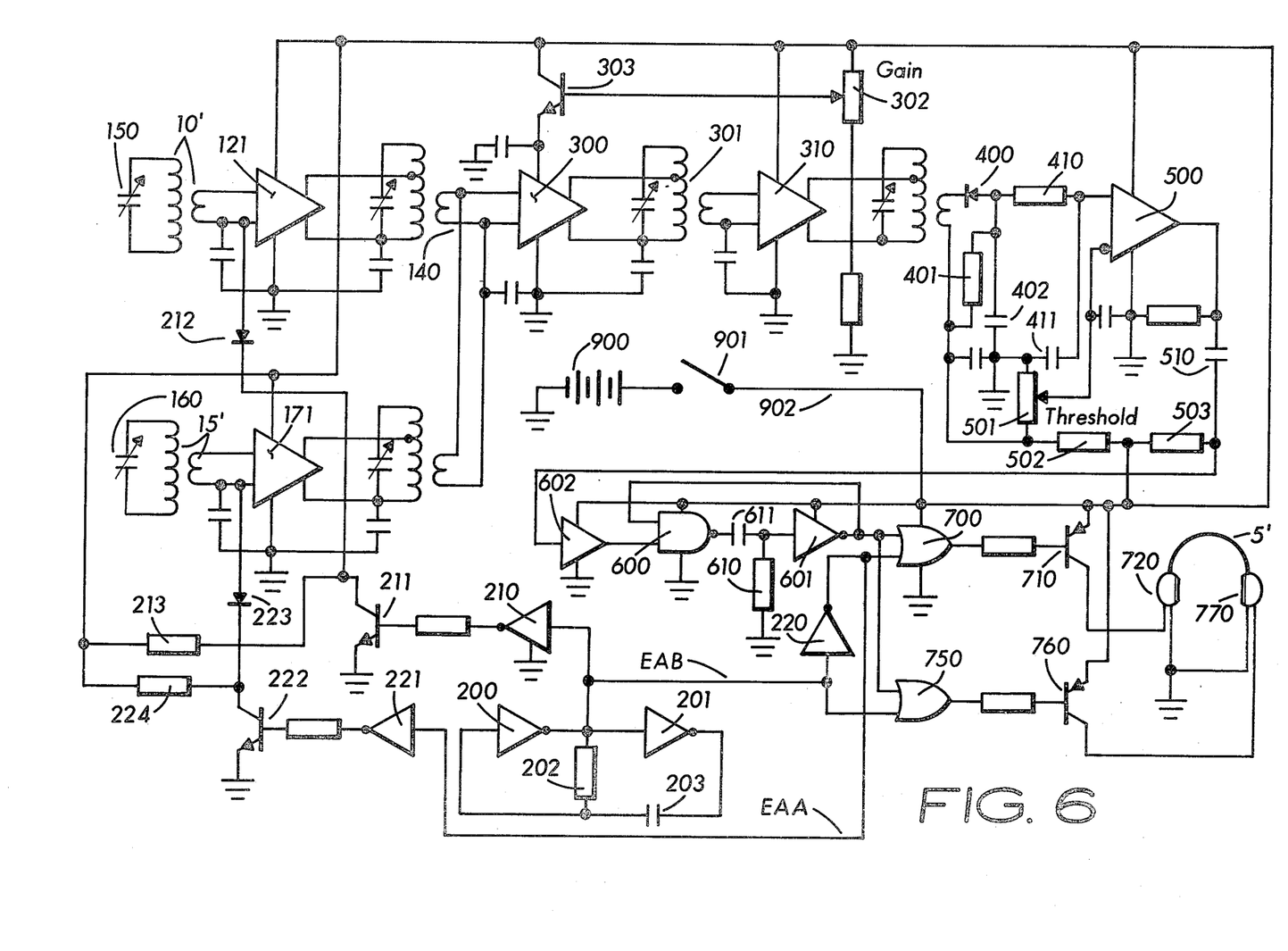
FIG. 6 electrical diagram for preferred embodiment of the instant teachings, in particular as a receptor for human operator response.

FIG. 6 serves to show the electrical diagram for one particular embodiment which may serve as way of example for the artisian of average field related skill to best understand the operation of my instant invention. Two effective inducers 10', 15' are shown resonated by tuning capacitors 150, 160 to a suitable frequency, say about 385 kilohertz being the same as the first signal frequency produced by the separate exciter. The inducers produce second signals "A" coupled to preamplifier 121 and "B" coupled to preamplifier 171. A gate oscillator, being a multivibrator consisting of gain stage inverters (say —4069B integrated circuit) and timing elements 202, 203 serves to produce a gate signal of a few hertz periodicity which further serves to gate preamplifiers 121, 171 "on and off" by way of coacting inverters 210, 220, 221, switch transistors 211, 222, steering diodes 212, 223, and pull-up resistors 213, 224. When the preamplifier is a uA-703 integrated circuit, clamping one input to ground through the switch transistor and steering diode has been found to upset the internal bias of the i.c. to such an extent as to greatly reduce its effective gain. The preamplifier so produced third signal outputs are parallel fed 140 into third signal amplifier 300 which is also gain controlled by variable impedance pass transistor 303 as controlled by GAIN potentiometer 302. A second third signal amplifier 310 is coupled 301 to the first third signal amplifier for further gain improvement. The third signal is then demodulated by envelope detector 400 including the usual detector load 401, 402, producing therefrom a fourth signal which couples to a threshold detector through an element low-pass filter, albeit integrator, including resistor 410 and capacitor 411 serving to reduce noise sensitivity. The threshold detector 500 fifth signal output further couples through differentiator network 510, 503 to inverter 602 to a signal processor including a monostable multivibrator consisting of NAND gate (say —4011A) 600 and inverter 601 together with timing elements 610, 611. The one-shot triggered oscillator output results in a sixth signal which is applied to one input of each OR gate 700, 750. The signal processor serves to regenerate the inputed fifth signal pulses into a sixth signal waveform of more uniform constancy. The sixth signal is then gated in an alternate, and synchronous, manner through application of the gate signal to the second inputs of OR gates 700, 750 in push-pull. The OR gate outputs consist of alternant first and second intelligencer signals which comprise keyed sixth signal bursts which serve to drive the bases of transistors 710, 760 and therefrom the individual earphones 720, 770 comprising headset 5'. The result is a "left" and "right" signal from the earphones which are proportionately indicative by way of periodicity rate as to the relative "left" or "right" relationship of the inducer means 10', 15' with respect to the radiating structure.

Figure 7:
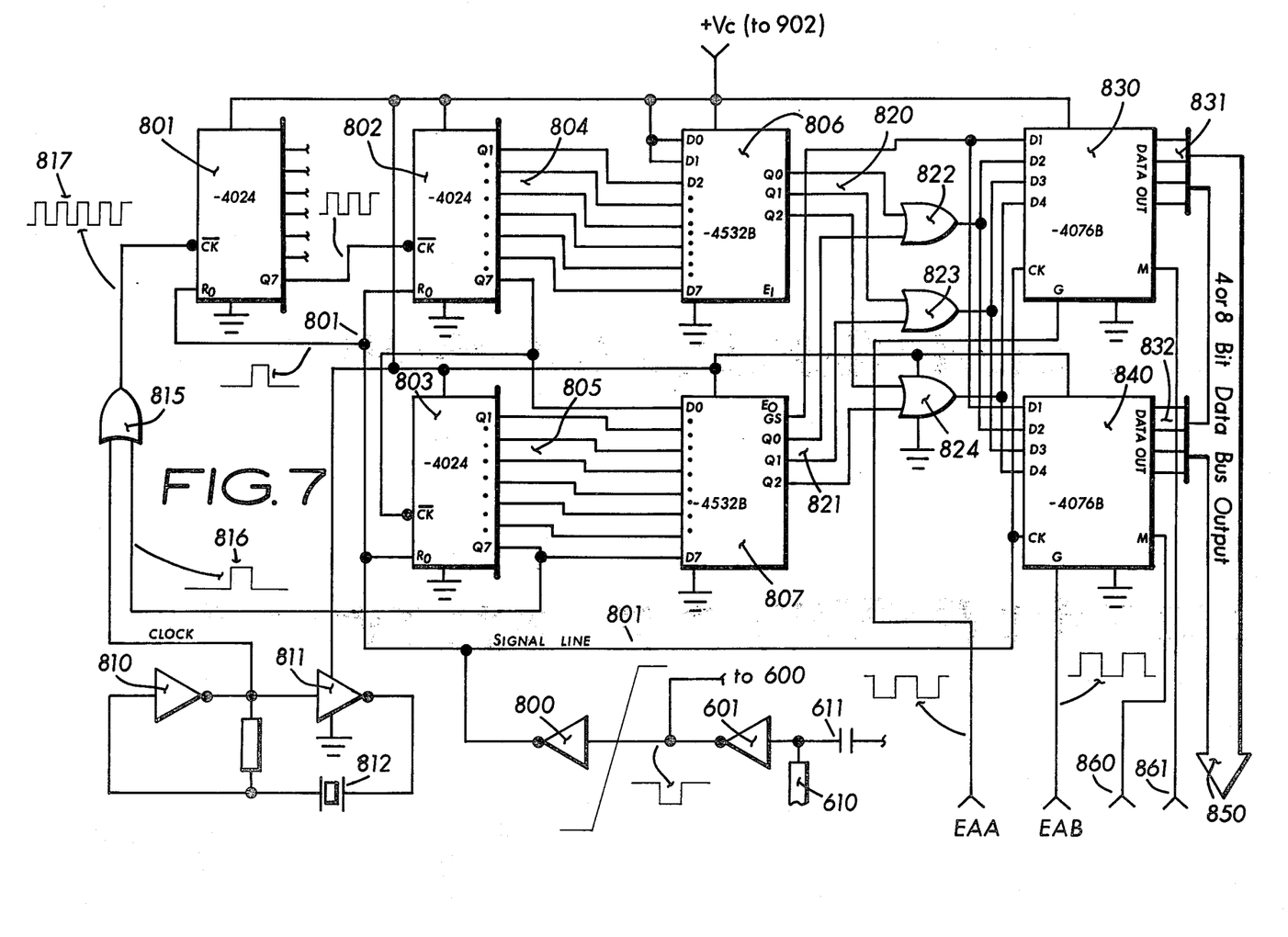
FIG. 7 electrical diagram for preferred embodiment of the pulse rate to binary code converter means adjunct to the receptor to be especially applicable with computer interface.

A pulse rate to binary code (PRBC) converter is shown in FIG. 7 which serves to convert the sixth signal rates produced by the triggered oscillator into multi-bit binary code values indicative of the periodicity of the sixth signal recurrence. A clock signal oscillator consisting of inverters 810, 811 including crystal element 812 operates at a frequency equal to about:

$$F_{CK} \approx (2.1 \cdot 128 \, F_{PA}) \approx 1,858.7 \text{ KHz}$$

where:
$F_{CK}$=clock frequency,
$F_{PA}$=highest incoming pulse train frequency modulating the first signal, exampledly 6,915 Hz.

What this shows is the effective derived clock frequency results to be about ten percent higher than the harmoniously related various sixth signal rates, the exact percentage not being so important as the requirement that it is clearly higher under all conditions of first signal component pulse train variations. The clock output serves to drive 817 a$\div 2^7$ counter 801 through OR gate 815. The Q7 output ($\div 128$) from counter 801 produces an effective 2.1 $F_{PA}$ signal of around 14,521.5 Hz which serves to clock $\div 2^7$ counter 802 producing seven binary outputs therefrom the Q7 line of which serves to serially clock ÷2⁷ counter 803, therefrom producing an additional seven binary outputs, for a total of fourteen, i.e., ÷2¹⁴ total power. Therefore the LSB counter 802 produces about 7,606.5 Hz on the Q1 line which is 1.1 $F_{PA}$. The result is, that for any sixth signal periodicity, counters 802, 803 will progressively count up to a binary value substantially representative of the period interval, because the signal acts upon the counters as a reset function via the signal line 801. This is to say, a signal pulse will RESET the counters, whereas the counters will advance between signal pulses under command of the clock. Important for this action is that the earlier said one-shot triggered oscillator have a period which is longer than:

$$T_P \leq \frac{1}{1.1\, F_{PA}}, \text{Exampledly:} \frac{1}{1.1(6,915Hz)} = 131\, uS$$

and yet less than:

$$T_P \geq \frac{1}{F_{PA}}, \text{exampledly:} \frac{1}{6,915\, Hz} = 141\, uS,$$

therefore being that 135 uS (microseconds) serves the exampled application well. When no reset occurs, due to lack of incoming signal, the counters advance until counter 803 line Q7 goes logic HIGH, inhibiting OR gate 815 and thereby stopping the count. Priority encoders 806, 807 (say—4532B) have priority data inputs coupled to the ÷2⁷ counters output lines 804, 805. The priority encoders serve to each produce a three-bit binary code output according to the highest HIGH data on the priority assigned data input lines. The encoders are further interconnected through OR gates 822, 823, 824 so as to effectively serve to produce a four-bit resultant signal indicative of the incoming signal 801 periodicity. For a $F_{PA}$ signal of 6,915 Hz, the resulting binary signals relative to other sub-$F_{PA}$ signals, i.e., $F_{PB}$, $F_{PC}$, etc. are as follows, with the shown hook-up:

| INCOMING SIGNAL | | OUTPUT | | | |
|---|---|---|---|---|---|
| Symbol | Frequency | A | B | C | D |
| $F_{PA}$ | 6,915 Hz | 0 | 1 | 0 | 0 |
| $F_{PB}$ | 3,457.5 Hz | 1 | 1 | 0 | 0 |
| $F_{PC}$ | 1,728.75 Hz | 0 | 0 | 1 | 0 |
| $F_{PD}$ | 864.38 Hz | 1 | 0 | 1 | 0 |
| $F_{PE}$ | 432.19 Hz | 0 | 1 | 1 | 0 |
| $F_{PF}$ | 216.1 Hz | 1 | 1 | 1 | 0 |
| $F_{PG}$ | 108.05 Hz | 0 | 0 | 0 | 1 |
| $F_{PH}$ | 54.02 Hz | 1 | 0 | 0 | 1 |
| $F_{PI}$ | 27.01 Hz | 0 | 1 | 0 | 1 |
| $F_{PJ}$ | 13.5 Hz | 1 | 1 | 0 | 1 |
| $F_{PK}$ | 6.75 Hz | 0 | 0 | 1 | 1 |
| $F_{PL}$ | 3.38 Hz | 1 | 0 | 1 | 1 |
| $F_{PM}$ | 1.69 Hz | 0 | 1 | 1 | 1 |
| NO SIGNAL | — | 1 | 1 | 1 | 1 |
| SIGNAL RATE TOO HIGH | | 1 | 0 | 0 | 0 |

The binary code signals are as applied to the D1 through D4 inputs of data latches 830, 840 serving as memory to hold previous data while the counters 802, 803 and encoders 806, 807 are refreshing their data. The D$\phi$ and D1 lines on the LSB encoder 806 connect directly to the +Vc rail, the result being that if the incoming signal frequency $F_P$ is substantially higher than $F_{PA}$, or 6,915 Hz in the example, the resultant output code is logic 1000. In the absence of a signal, the output logic code is logic 1111. The leading, or positive, edge of the signal line pulse 801 serves to CLOCK latches 830, 840 thereby entering the DATA on the inputs prior to the clearing of the encoder output data 820, 821 by way of the counter 802, 803 reset action. Signals EAA, EAB from the gate signal oscillator in FIG. 6 serves to alternately strobe the data 831, 832 entering the latches in synchronization with the earlier said second signal diplexing action. The data is subsequently coupled to an external computer, or bit-data processor, by way of the data bus output 850. The output data is further controlled through output read strobe lines 860, 861 to enable the data bus according to decoded instruction from an external computer which, in this definition, serves as a recipient intelligent being.

Figures 8, 9:
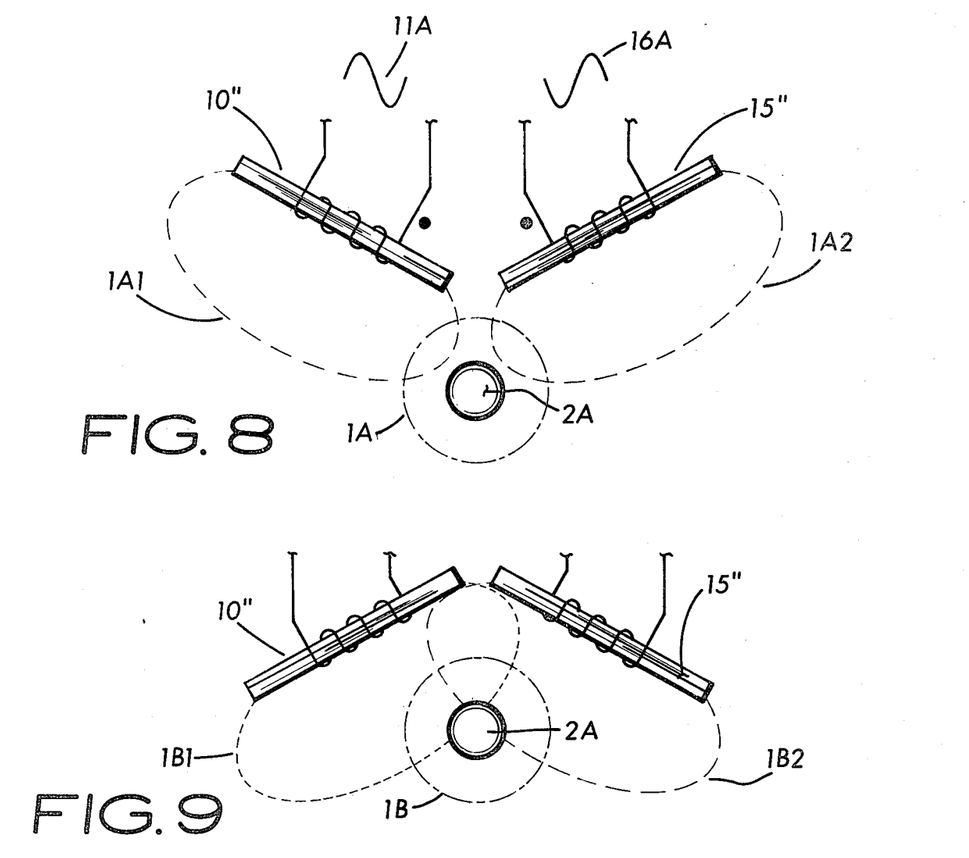
FIG. 8 inducer arrangement for tracing concealments of significant inducer to structure spacings.
FIG. 9 inducer arrangement for tracing concealments with close inducer to structure spacings.

One arrangement of inducers 10″, 15″ shown in FIG. 8 provides angular displacement between the inducer axis, thereby reducing the co-coupling therebetween whilst maintaining field line response 1A1, 1A2 to the first signal 1A of goodly proportion. The result is an arrangement best suited for tracing relatively distant structures, as buried pipes 2A or the like.

An arrangement more suited to nearby tracing, as wires run through walls or the like, uses two inducers 10″, 15″ in angular displacement FIG. 9, but quite opposite to that forementioned. The field line response 1B1, 1B2 more confinedly responds to the first signal 1B, but for close positioning, can serve to provide more definitive response separation. Particular application includes tracing wires and pipes confined in building walls or the like.

Figure 10:
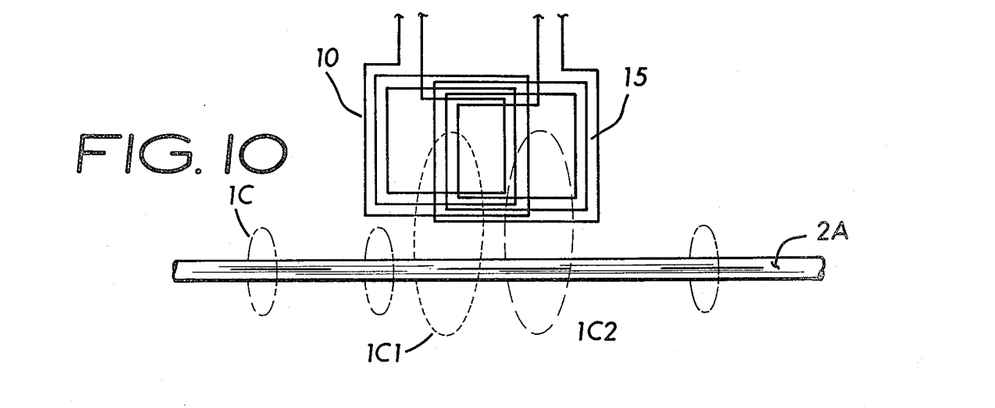
FIG. 10 spiderweb, or open wound, loop antennae arranged for minimum cross-coupling effect.

FIG. 10 shows the use of "spiderweb" loop antennae inducer arrangement. The important detail is the overlapping of the two shown antenna loops to a position of minimum cross-coupling. Through proper positioning, which is about a center-to-center spacing of:

(D1+D2)/4 the cross coupling will be very nearly nulled out, while maintaining goodly response 1C1, 1C2 to first signal 1C. The larger dimension the "spiderweb" configuration provides offers, in certain forms of my invention, improved signal sensitivity due to the relatively larger "aperture" provided by such an antenna. Such antenna arrangements have been investigated with surprisingly good results when used with my instant invention, in particular when such application involved tracing structures relatively distant from the antennae.

Figure 11:
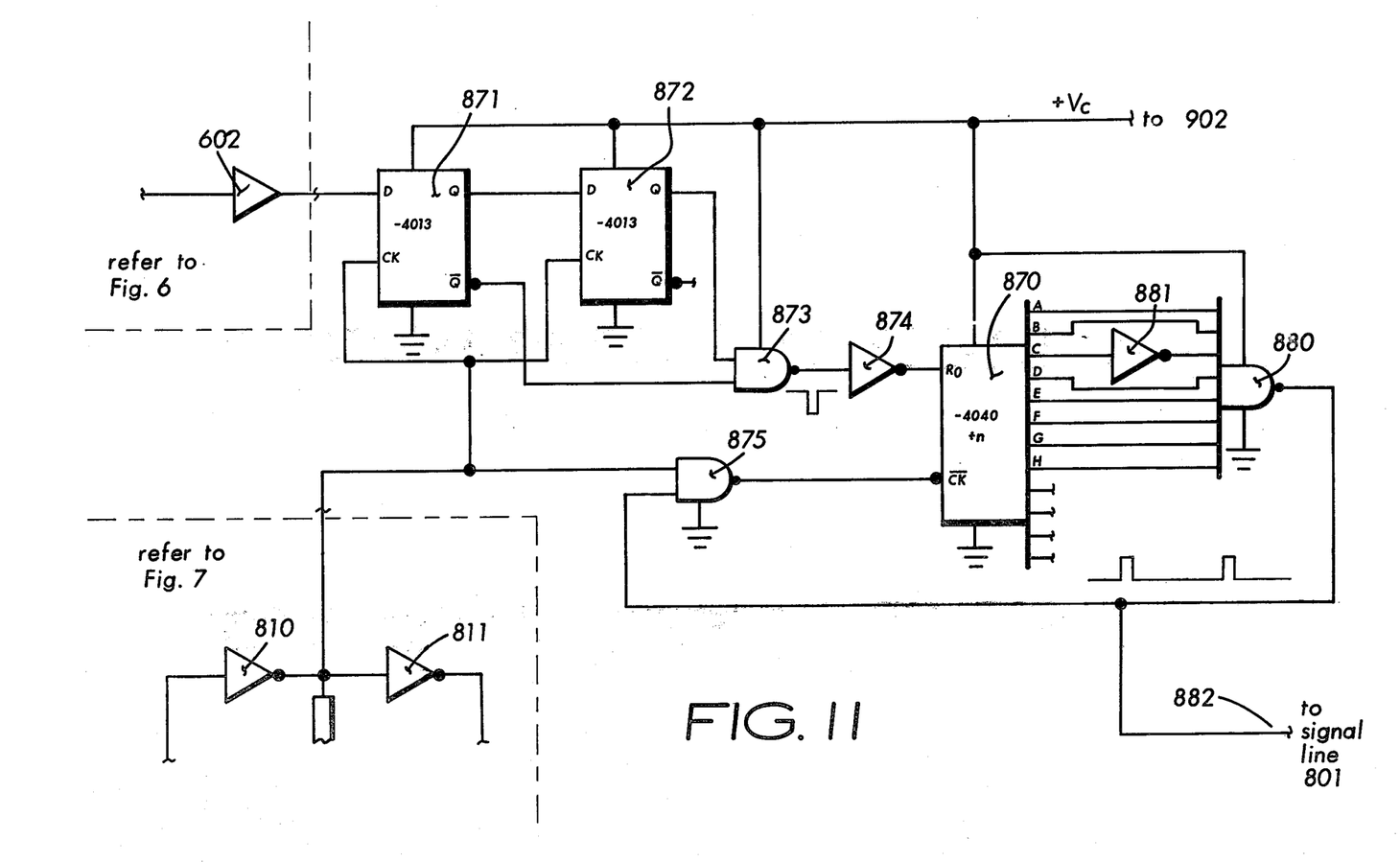
FIG. 11 signal processor for providing sixth signal of improved form and constancy for cooperation with PRBC converter means.

A preferred signal processor for use with the PRBC converter described in FIG. 7 is shown in FIG. 11. Instead of the presaid triggered oscillator, a multibit binary counter 870 is used, say type —4040A. As shown, the 1,858.7 KHz clock signal from oscillator 810 is coupled to the counter 870 CLOCK input through NAND gate 872. The SIGNAL from buffer 602 couples to the DATA input of "D type" flip-flop 871, whilst the Q output couples to a second flip-flop 872 DATA input. The CLOCK signal serves to clock each flip-flop. What occurs is when a logic "0" signal pulse appears on flip-flop 871 "D" input, it will transfer to the Q output on the next clock cycle positive transistion, and to the Q output of the second flip-flop 872 on the second clock pulse positive transistion. An overlap occurs for the NAND gate 873 when both inputs will be logic "1" for one clock cycle period, producing a 0.538 uS output therefrom which is inverted 874 and serves to reset counter 870. The result is the counter will start to count about one microsecond after the occurence of a SIGNAL pulse from buffer 602. The counter will advance until a count of logic 1101 1111 occurs on the output which will serve to enable NAND gate 880, including inverter 881, so as to produce a standardized signal line 801 pulse therefrom of about 135 microseconds duration. When the count is reached and gate 880 output is logic "0", gate 875 will disable inhibiting any further clocking of the counter until reset. Such a binary rate determined signal provides an improved, more uniform signal form for the PRBC converter operation. As described, the processed signal nominally exhibits about 0.39% jitter tolerance.

While not detailedly shown, the bit data processor means brought forth in the discussion of FIG. 7 includes supportive circuits capable of operating digitally driven displays, and through known D/A conversion techniques, to drive analog displays such as "panel meters".

The DATA BUS output, as in FIG. 7, shall include computer interface operation which can serve to provide positioning compensation for the several inducers so as to acheive a desired effect.

While I have endeavored to describe my instant invention in terms which may be practiced by a skilled artisian, this shall in no way serve to limit the scope of the novelty of my teachings to this form alone.

Particular circuit combinations are shown which serve to provide fruition for my preceptive description. The scope of my instant teachings is, however, satisfied with any reasonable circuit combination which can serve to meet the several operative modes for my invention.

Integrated circuit elements are described in the practice of my invention which functions may, understandably, be met with other combinations of microcircuits or built-up circuit elements.

The instant invention may be practiced as a hand-carried apparatus for tracing buried cables and pipes when provided in a suitable enclosurement as would be obvious for such application; installed on a vehicle as say a motor vehicle, watercraft, or flightship, etc., for purpose of locating and surveying a structurement; or else as a substantially fixed detector means wherein the structure is variously located, as in underwater cable or pipe tide-flexure shift measurements.

What I claim is:

1. Translative intelligencer means plurally responsive to the signal pattern level of an amplitude variant first signal pattern envelope produced by a substantially separate exciter means, said signal produced thereby being effectively comprised of an ordered sequence of signal pulses of various instantaneous energy levels principally controlled to recur at a periodic frequency rate at least equal to the highest frequency pulse component in said signal pattern, said intelligencer means coupled thereto and operative to produce therefrom at least one demodulated pulse train signal the components of which are substantially indicative of at least one of the various values of the said signal level, as usually produced by impedance variation in the coupling between the said intelligencer means and said exciter means including in combination:
   a. a substantially separate source means, adapted for producing a first signal therefrom;
   b. plural input terminal means each usually coupled by way of an effectively separate variable impedance with said source means, operative to therefrom produce a plurality of effectively separate second signals each representing an electric value which is proportional to the amount of effective coupling impedance present between the said source means and each said input terminal means;
   c. gate control signal source means producing at least a first gate signal and a second gate signal in substantially alternant sequence therefrom;
   d. plural gated preamplifier means having separate second signal source inputs thereto, each coupled in a substantially separate way with a said input terminal means; further coupled with said gate control signal source; operative as a multiplex function to produce at output means therefrom a composite third signal comprising in repetitious succession at least a component third signal "A" which is essentially the combination of one said second signal gated between a state of maxima and minima value in sequential combination by said first gate signal, and a component third signal "B" which is essentially the combination of a second said second signal gated between a state of maxima and minima value in sequential combination by said second gate signal;
   e. envelope detector means effectively coupled to said plural gated preamplifier means and responsive to said composite third signal so as to produce a detected substantially unipolar fourth signal therefrom the instantaneous value of which is proportional to the value of the corresponding component third signal value comprising the said composite third signal;
   f. threshold detector means effectively coupled to said envelope detector means and selectively responsive to various instantaneous value components of the therefrom produced fourth signal values, being operative so as to further produce a correspondent fifth signal therefrom the value of which is substantially determined by the level of the said fourth signal values;
   g. signal processor means coupled to said threshold detector means and operative to act upon said fifth signal so as to produce a sixth signal therefrom of proportional value and improved form;
   h. indicative control means coupled to said signal processor means and further coupled with said gate control signal source, effectively operative as a demultiplexer function to produce at an output terminal means therefrom at least a first intelligencer signal value which is proportional to the combination of the effective first gate signal and that part of the said sixth signal value shown to be established by the effect of the said component third signal "A", and a second intelligencer signal value therefrom which is about proportional to the combination of the effective second gate signal and that part of the said sixth signal value shown to be established by the effect of the said component third signal "B"; and
   i. source of power coupled to each of the operative means comprising the translative intelligencer so as to effect operation thereof.

2. Translative intelligencer means of claim 1 wherein at least said first and said second input terminal means each include substantially separately responsive inducer means variously coupled to the effective said first signal source means so as to produce second signal values therefrom in proportion to the proximal relationship between each respective said inducer and the field of efficaciousness produced by the said source means.

3. Translative intelligencer means of claim 1 wherein said first and said second input terminal means each include substantially separate antenna means variously coupled to the effective said first signal source means so as to produce second signal values therefrom in proportion to the proximal relationship between the respective said antenna and the field of efficaciousness produced by the said first signal.

4. Translative intelligencer as in claim 1 wherein said first intelligencer signal and said second intelligencer signal are alternating current signals separately coupled with a binaural headset means so as to produce an effectively RIGHT earphone and an effectively LEFT earphone audible signal therefrom the respective audio rate periodicities of which are in each instance substantially proportional to each of the at least two said second signal values produced at the said input terminal means.

5. Translative intelligencer as in claim 1 wherein said indicative control means includes a binary code converter means purposefully operative to substantially serve to convert various demultiplexed sixth signal values into binary bit sequence signals of proportionately various weighted values.

6. Translative intelligencer as in claim 5 wherein said binary code converter means effectively includes at least a CLOCK means and a COUNTER means, said COUNTER means being further operative in conjunctive combination with said sixth signal values and said CLOCK signals so as to produce a binary signal output therefrom representative of said sixth signal value.

7. Translative intelligencer as in claim 6 wherein said binary code converter means further includes at least a memory means effectively coupled to said counter means binary output signals, said memory being effectively operative to store valid said binary output signals for indeterminate periods when said counter means binary output signals are invalid when said counter is recounting.

8. Translative intelligencer as in claim 5 wherein said binary code converter means serves to produce a DATA BUS signal having a plurality of binary signal values adapted for cooperative interconnection with a separate responsive apparatus, viz usually a computer DATA BUS interface connection.

9. Translative intelligencer as in claim 2 wherein said inducer means includes at least two solenoidal wound loop antennae arranged on dissimilar axis, e.g., the axis are arranged in angular dissimilitude.

10. Translative intelligencer as in claim 2 wherein said inducer means includes at least two substantially side-by-side flat-wound, e.g., spiderweb wound, loop antennae arranged with respective approximately parallel axis offset relationship of about:

$$(D_1 + D_2)/4$$

where: $D$ = effective diameter of respective loop 1 or else loop 2.

11. Translative intelligencer means as in claim 6 wherein said binary code converter effectively combines said fifth signal and said CLOCK signal in a combinative arrangement of sequentially operative flip-flops, which at least are in part operative as a binary counter means, into a consubstantial sixth signal.

12. Translative intelligencer means as in combination of claim 2 or claim 4 wherein said apparatus is in the form of a short, usually operator hand-carried, staff upon the first end of which at least is supported the plural said separately responsive said inducer means whilst upon the second end of which is effectively arranged the residuum of the said apparatus operating means further to which is coupled the said RIGHT and said LEFT earphone comprizing an operator worn headset.

* * * * *